US008959076B2

(12) United States Patent
Herger et al.

(10) Patent No.: US 8,959,076 B2
(45) Date of Patent: Feb. 17, 2015

(54) MANAGING A SERVICE CATALOG THROUGH CROWDSOURCING

(75) Inventors: Lorraine M. Herger, Port Chester, NY (US); Neal M. Keller, Pleasantville, NY (US); Matthew A. McCarthy, Holly Springs, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/476,168

(22) Filed: May 21, 2012

(65) Prior Publication Data

US 2013/0311644 A1    Nov. 21, 2013

(51) Int. Cl.
*G06F 17/30* (2006.01)

(52) U.S. Cl.
CPC .... *G06F 17/30097* (2013.01); *G06F 17/30241* (2013.01)
USPC ........................................................ 707/708

(58) Field of Classification Search
CPC .......... G06F 17/30241; G06F 17/3005; G06F 17/30097; G06F 17/301; G06F 2212/7207; G06F 11/3086; G06F 17/30864; H04L 29/06027
USPC ........................................................ 707/708
See application file for complete search history.

(56) References Cited

U.S. PATENT DOCUMENTS

| | | | | |
|---|---|---|---|---|
| 8,555,317 | B2 * | 10/2013 | Cho et al. | 725/44 |
| 2007/0220051 | A1 * | 9/2007 | Brentano et al. | 707/104.1 |
| 2008/0033775 | A1 | 2/2008 | Dawson et al. | 705/7.28 |
| 2008/0046929 | A1 * | 2/2008 | Cho et al. | 725/46 |
| 2008/0221964 | A1 | 9/2008 | Berkovitz et al. | 705/80 |
| 2010/0042928 | A1 | 2/2010 | Rinearson | 715/737 |
| 2010/0268735 | A1 * | 10/2010 | Planty et al. | 707/770 |
| 2011/0231229 | A1 | 9/2011 | Hadar | 705/7.38 |
| 2013/0060796 | A1 * | 3/2013 | Gilg et al. | 707/756 |

FOREIGN PATENT DOCUMENTS

WO    WO2010116333    10/2010    ........ G06F 7/00

OTHER PUBLICATIONS

"VMware Service Manager" www.vmware.com/products/datacenter-virtualization/service-manager/overview.html, printed Feb. 12, 2012.

* cited by examiner

*Primary Examiner* — Krisna Lim
(74) *Attorney, Agent, or Firm* — Ido Tuchman; Vazken Alexanian

(57) ABSTRACT

A method, system, and computer program product for managing a plurality of services in a service catalog. Metadata is received about one or more services. The metadata is analyzed to determine whether to perform a management activity on the service catalog, the management activity including recommending one or more services in the service catalog or coupling two or more services in the service catalog. If it is determined that the received metadata is insufficient, a signal is generated to gather additional metadata within a time period the metadata is determined to be insufficient.

19 Claims, 4 Drawing Sheets

MANAGING A SERVICE CATALOG THROUGH CROWDSOURCING

BACKGROUND

This invention relates to managing a service catalog and more particularly to managing a service catalog through crowdsourcing.

A service catalog refers to a list of services provided by an organization. For example, a service catalog can list services provided by an organization to its employees or customers. Each service within the catalog may include: a service description, an SLA (service level agreement) or timeframes for fulfilling the service, who is authorized to request/view the service, any applicable costs, and how the service is fulfilled.

Cloud computing refers to the remote use and access of multiple server-based computational resources via a communication network, such as a wide area network (WAN), an Internet connection using the World Wide Web, etc. In cloud computing, computer applications are often provided and maintained by a cloud server and associated data is stored on the cloud sever. Users of cloud-based resources may access cloud servers using various client computers, such as a desktop computer, netbook, smart phone, or other device.

On-demand software refers to a software delivery model in which software and its associated data are hosted centrally maintained. On-demand software is sometimes referred to as software as a service (SaaS). On-demand software may be, for example, hosted on a computer cloud and accessed by users using a client computer via a web browser over the Internet. On-demand software can be found for many business applications, such as, accounting, collaboration, human resource management (HRM), customer relationship management (CRM), enterprise resource planning (ERP), content management (CM) and service desk management.

Crowdsourcing refers to the practice of using a group of people, or a crowd, in order to accomplish a task. Crowdsourcing often takes place over the Internet and has become a popular tool across various industries based on the power of leveraging large numbers.

BRIEF SUMMARY

Accordingly, one example of the present invention is a method for managing a plurality of services in a service catalog. The method includes a receiving step for receiving metadata about one or more of services. An analyzing step analyzes the metadata to determine whether to perform a management activity on the service catalog. The management activity includes recommending one or more services in the service catalog or coupling two or more services in the service catalog. A determining step determines that the received metadata is insufficient. A generating step generates a signal to gather additional metadata within a time period if the metadata is determined to be insufficient.

Another example of the present invention is a system for managing a plurality of services in a service catalog. The system includes a server that further includes a processor. The server is configured to receive metadata about one or more of services. The server is further configured to analyze the metadata to determine whether to perform a management activity on the service catalog. The management activity includes recommending one or more services in the service catalog or coupling two or more services in the service catalog. The server is additionally configured to determine that the received metadata is insufficient. The server is also configured to generate a signal to gather additional metadata within a time period if the metadata is determined to be insufficient.

Yet another example of the present invention is a computer program product for managing a plurality of services in a service catalog. The computer program product includes a computer readable storage medium having computer readable program code embodied therewith. The computer readable program code is configured to receive metadata about one or more of services. The computer readable program code is further configured to analyze the metadata to determine whether to perform a management activity on the service catalog. The management activity includes recommending one or more services in the service catalog or coupling two or more services in the service catalog. The computer readable program code is additionally configured to determine that the received metadata is insufficient. The computer readable program code is also configured to generate a signal to gather additional metadata within a time period if the metadata is determined to be insufficient.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
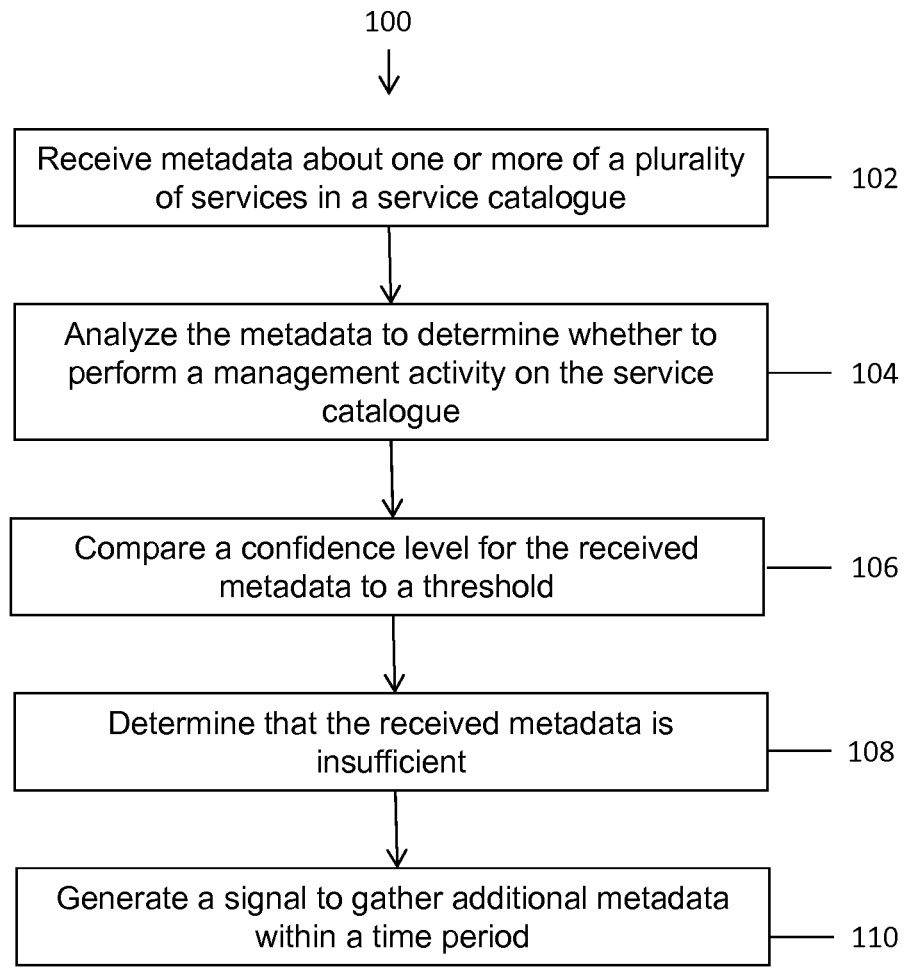
FIG. 1 shows a method for managing a plurality of services in a service catalog in accordance with an embodiment of the present invention.

The present invention is described with reference to embodiments of the invention. Throughout the description of the invention reference is made to FIGS. 1-6. When referring to the figures, like structures and elements shown throughout are indicated with like reference numerals.

In an embodiment of the invention, a system and method are described in which services from a service catalog are offered to customers based on a crowdsourcing component. By way of example, services may include software services, standard services, or coupled services. As discussed in detail below, the crowdsourcing component may include a multidimensional vector for a service that specifies compatibility and utility along several dimensions, such as, cost, utility, risk, ease of use, performance, lifecycle characteristics, or other commonly known elements. The value of the magnitude of the vector may be used to automatically create and alter the catalog of services through time. Service levels (bronze, silver, gold) may also be considered in the analysis. Although the magnitude of such a vector is used as an example, many other kinds of vector characteristics can be used, including vector projections. Each component of the vector may receive different weights depending on relative importance.

From the user's perspective, a user may visit a website to search for a specific service, for example, a SMB (small and medium business) user searching for eCommerce services for a new product, e.g., secure credit card services. The service catalog site groups services by category and allows for user searching. The user may select a desired service and view the description. Additionally, the user may also have access to, or see a visualization of, the crowdsourced multidimensional vector for the service.

In accordance with an embodiment of the invention, a threshold value T may be compared against a multidimensional vector for the services in the catalog, and the user may be presented with a service if the multidimensional vector for that service is greater than T. The threshold value T may be compared against, for example, a magnitude of the multidimensional vector, a projection of the multidimensional vector, or some value that represents a combination of the two. By way of example, the user may enter a threshold value T or the threshold value T may be preselected. Presenting a service may include showing a service in the service catalog or recommending a service in the service catalog.

By way of example, if the multidimensional vector for a service is below the threshold T, the service may be hidden from the catalog or may not be recommended to the user. In an embodiment of the invention, multidimensional vectors for particular services may be compared against each other. In this manner, the services may be listed in a in a hierarchical style in the service catalog based on how they compare to one another.

The user may also enter relevant information, e.g., contact information and service-specific questions, and a visualization of the crowdsourced multidimensional vector, or a report that is related to the vector, may be updated based on the entered information. The user may finally submit the request for service. In an example, the request may require approval, and the approver may also access or see the crowdsourced multidimensional vector. The user may return to the site later to check on the status of a request or to view overall crowdsourcing metrics on how well one or more organizations are performing the services they provide.

In an embodiment of the invention, if insufficient crowdsourced data is available, a signal is automatically sent to a crowdsourcing component so that extra crowdsourced data may be retrieved. Crowdsourced data may be found to be insufficient if a multidimensional vector for a service is determined to be below a confidence level threshold. By way of example, the multidimensional vector may be compared to the confidence level threshold by comparing a magnitude of the multidimensional vector, a projection of the multidimensional vector, a value that represents a combination of the magnitude and a projection of the multidimensional vector, or a confidence level for the multidimensional vector to the confidence level threshold.

In an embodiment, a fee may be charged to provide this extra information. Crowdsourcing may be accomplished in many automated ways. For example, crowdsourcing may be achieved by sending emails to experts, members of a team in a company or a number of companies, registered users, or any other individuals determined to be relevant. Similarly, a query may be posted in an electronic bulletin board, submitted via a social media website, presented in a portal, or otherwise electronically processed. The information that is retrieved from such crowdsourcing may then be used to update the values of the multidimensional vector so that they are more useful and accurate. When the crowdsourcing signal is sent, a "need-time" may also be sent. For example, the system may request that a response be received within 5 minutes.

In an embodiment of the invention, a DeepQA, i.e., deep question and answering with natural language parsing, may be used with respect to the service catalog. Crowd-sourcing may be automatically triggered when a confidence level associated with the confidence of suggested possible services to be included in a service catalog is below a threshold confidence level.

For example, consider an application of such DeepQA technologies as a "Digital Service Catalog Creator" (DSCR). This example can be used to show how higher confidence answers may be derived using this technique. For example, a user may ask a question containing the words "mobile devices," "connectivity tools," and "security." Next, the DSCR may suggest a service based upon a combination of several of the following elements: 1) an analysis of information in databases, 2) a crowd-sourcing element, automatically triggered to update when an answer (with respect to a service) has a low confidence level, 3) an analysis of past user queries, along with a user profile that specifies information about the user, and 4) an analysis of word combinations used for similar users.

In an embodiment, the DSCR may make use of a user profile, stored on a device, which specifies various user attributes including areas of interest or some subset of attributes such as previous use, security level, nationality, language, occupation, and other such user-specific information. This profile may be queried to aid the system in providing a relevant and/or higher-confidence answer. In instances where sufficient time is available to complete an analysis to determine the appropriate service, but sufficient information is not available for the analysis to reach a criterion confidence threshold, an active learning component may be triggered that summarizes the situation and context and distributes this information electronically to a pre-configured set of managers and experts. Their responses may then be incorporated into the system's analysis data for future use. Confidence values, for example, may grow as crowd-sourcing is performed, and during this time may approach some threshold. At this point, an action-taking component is allowed to take action and prompt the user and/or change the service catalog. By way of example, the confidence level can be indicated by a visual indicator, audio indicator, or textual indicator. In addition, when a confidence level is changed based on an update, the change may be indicated by a visual indicator, audio indicator, or textual indicator.

In an embodiment of the invention, service metadata, user context, and machine learning may be used to help determine when services should be coupled, i.e., become part of a composite or bundled service, or be uncoupled. The creators and users of service catalogs may not be easily aware of what tightly or loosely coupled services should be part of a couple. Services may contain metadata that assist in coupling or uncoupling services. Coupling services may take into account such variables as cost, utility, risk, compatibility, ease of use, lifecycle characteristics, etc.

In an embodiment of the invention, an administrator or service provider may identify a distance metric based on closeness of service metadata and prior usage patterns in the service catalog. By way of example, distance metric refers to a data model construct that is used to score and weight relational metadata for service-couple candidacy. Closeness refers to how score and weight positions services as coupling candidates. Thus, closeness refers to aforementioned characteristics, e.g., compatibility and utility along several dimensions, e.g., cost, utility, risk, ease of use, performance, life cycle characteristics, etc. By way of example, to determine closeness, the distance metric may be based on crowdsourced data for a candidate services, such as a crowdsourced multidimensional vector.

In an embodiment of the invention, if insufficient crowdsourced data is available, a signal is automatically sent to a crowdsourcing component so that extra crowdsourced feedback may be retrieved. Crowdsourced data may be found to be insufficient if a multidimensional vector for a service that is a candidate to be coupled is determined to be below a confidence level threshold. By way of example, the multidimensional vector may be compared to the confidence level threshold by comparing a magnitude of the multidimensional vector, a projection of the multidimensional vector, a value that represents a combination of the magnitude and a projection of the multidimensional vector, or a confidence level for the multidimensional vector to the confidence level threshold.

By way of example, the system may then use unsupervised machine learning to identify a new coupled service based on the distance metric. Lastly, an automated service may name the new coupled service and add it to the service catalog. Naming refers to the unique title in the service catalog given to a coupled service. Coupled service creation is a technique that repackages a group of individual (pre-existing) services under a new title in the catalog. The naming may be automated, for example, based on names for similar services or coupled services encountered in the past or based on a crowdsourcing of appropriate names. As an example, crowdsourcing, e.g., voting, may suggest that a particular service is highly relevant and useful for the area of "mobile worker." In addition, topic analysis can automatically be performed on descriptive information associated with individual services, and such topics may be used to automatically determine useful names and labeling. Known methods for topic extraction include the use of tags, latent semantic indexing, etc.

Consider a company that has a large population of home office workers. Individual services may be developed and offered via the catalog that target employee productivity. The services include high-speed wireless Internet (data) and home Office Phone Line (voice). These two services may be offered and can be ordered individually. In an embodiment, the service provider can identify the distance metric for these two services. The machine learning may use home worker services metadata to evaluate the use of a coupled service to combine these services into one service offering. The resulting metric score indicates the value of these services as a coupled service and the administrator may add this coupled service to the catalog with a title, for example, "Complete Home Office Worker."

In an embodiment of the invention, the following steps may be employed to identify metadata related to the degree of coupling of services.

1. Administrator or service provider identifies criteria for determining interdependencies of service components. By way of example, in a composite model a service component may be a remote access client software product. The service may be thought of as a layer in a composite service stack. In the case of a mobile or smart-phone domain, the composite layers may include: smart phone device(s), mobile OS, VPN client, security software, and business applications that run on a mobile OS (e.g. company e-mail and IM). Components may also include dependent business processes or skilled resources.

2. Administrator or service provider selects one or more existing services.

3. System makes use of known methodologies to determine degree of coupling of components in selected services. For example, U.S. Pat. No. 7,877,293 describes techniques for using machine learning to inform user context based resource search and selection in various domains including education, travel, and real estate. U.S. Pat. No. 7,877,293 incorporated herein by reference in its entirety.

4. An automated service labels each analyzed service package as tightly coupled, i.e., composite, or loosely coupled, i.e., bundled. In an embodiment of the invention, labeling may be automated, for example, based on labeling for similar services encountered in the past or based on a crowdsourcing of appropriate names and labeling. As an example, crowdsourcing, e.g. voting, may suggest that a particular service is highly relevant and useful for the area of "mobile worker." Also, topic analysis can automatically be performed on descriptive information associated with individual services, and such topics may be used to automatically determine useful names and labeling. Known methods for topic extraction include the use of tags, latent semantic indexing, etc.

5. Metadata describing the degree of coupling for each service is added to the package metadata visible to catalog users.

In order to support of the home officer worker employees, IT services may be made available for order via the company IT Catalog. These employees can order Mobile Accounts, Devices, Connectivity tools, Security, and Business Software Services for mobile computing platforms. These services can be ordered individually, but there is value in coupling them as a Composite Service. In an embodiment of the invention, the service provider may identify multiple interdependencies in the distance metric related to Mobile Workers and Mobile Technology. Machine learning may use metadata from existing services to evaluate the degree of coupling for each of the candidate services identified by the aforementioned distance metric. The resulting metrics and scores indicate the degree of coupling, e.g., tight or loose, required for design of the Composite Service package. Finally, the administrator may add a new composite service to the catalog with a title "Mobile Worker in a Box".

In consideration of similar previous systems, single-domain rules-driven coupled service selection systems, such as those used for corporate travel planning, are transactional, focused on providing a dictated single solution based on pre-coded logic without taking into account a rich set of contextual information. On the other hand, certain benefits of the present invention include solutions that are not merely transaction and that are based on contextual information, such as metadata.

Recent trends in the technology marketplace bring to light the benefits of the described invention. IT Service Description Language/SDL concept emphasize smart integration of IT Services. The concept applies a structured markup or description language that can analyze business value versus complexity with respect to the "degree of coupling" for two or more separate services. The business value of coupling represents a potential net-benefit to the business (provider and/or customer), achieved by integrating two or more specific services. The degree of coupling involves the calculation of the complexity (technical and business process integrations/dependencies) associated with coupling a specific set of services. The degree of coupling, or dependencies, enables one of the following models: 1) Bundles have loose coupling with minor dependencies, and 2) Composites have tight coupling with multiple and/or major dependencies.

The following briefly outlines an IT service description language (taxonomy, classifications, attributes, syntax, schema) that exemplifies and evaluates the coupling characteristics for services as candidates for bundle or composite service coupling. The two services below are good candidates for a composite service. In this case, the fields that are key to coupling include:

Platform: "SUSE-Web" standard Linux OS build, which adds standard Web server build, (WAS/Apache). This is usually compatible with Service #2 "Linux—Web"

Model: The composite model indicates that both services are executed end-to-end. The service may be automated but has some approval work flows requiring an approver response.

Control: The control is an ideal match based on the sequence primary & secondary: this also addresses the perquisite that Service #2 be dependent.

Service #1: Standard Offering—B2B Web Application build
Domain: <Infrastructure>
Category: <Hosting>
Environment: <Cloud>
Platform: <SUSE—Web (+DB)>
Application: <Internet—B2B>
Package: <Production Build>
Model: <Composite>
Control: <Sequence, primary>
Service #2: VeriSign Digital Certificate
Domain: <Infrastructure>
Category: <Security>
Environment: <External>
Platform: <Linux—Web>
Application: <Digital Certificate>
Package: <Install, Configure, Renew>
Model: <Composite>
Control: <Sequence, secondary>

FIG. 1 shows a method for managing a plurality of services in a service catalog according to one embodiment of the present invention. The method includes a receiving step 102. During the receiving step 102, metadata is received about one or more services in the service catalog. In an embodiment, the received metadata includes multi-dimensional vector information about one or more of the services in the service catalog. By way of example, the received metadata is gathered via crowdsourcing. After the receiving step 102 is completed, the method continues to analyzing step 104.

At analyzing step 104, the metadata is analyzed to determine whether to perform a management activity on the service catalog. In an embodiment, the management activity includes recommending one or more services in the service catalog and/or coupling two or more services in the service catalog. After the analyzing step 104 is completed, the method continues to comparing step 106.

At comparing step 106, a confidence level for the received metadata is compared to a threshold. After the comparing step 106 is completed, the method continues to determining step 108. At determining step 108, if the confidence level for the received metadata is below the threshold, it is determined that the received metadata is insufficient. After the determining step 108 is completed, the method continues to generating step 110.

At generating step 110, if the metadata is determined to be insufficient a signal is generated to gather additional metadata within a time period. In an embodiment, the signal comprises a signal to collect additional metadata via crowdsourcing.

Figure 2:
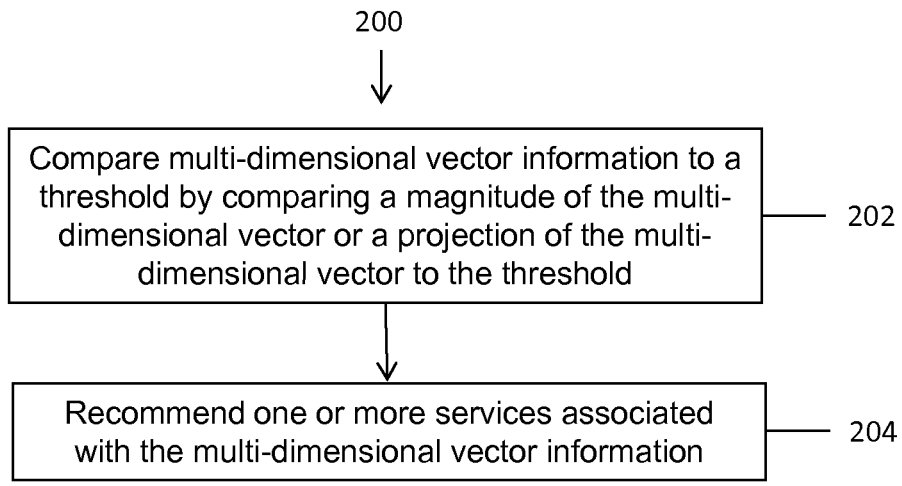
FIG. 2 shows a method for analyzing received metadata to determine whether to perform a management activity on a service catalog in accordance with an embodiment of the invention.

FIG. 2 shows a method for analyzing received metadata to determine whether to perform a management activity on a service catalog in accordance with an embodiment of the invention. For example, analyzing step 104 of FIG. 1 may further include the method steps of FIG. 2.

The method of FIG. 2 includes a comparing step 202. At comparing step 202, received multi-dimensional vector information is compared to a threshold. In an embodiment, the comparing further comprises comparing a magnitude of the multi-dimensional vector information to a threshold or comparing a projection of the multi-dimensional vector information to a threshold. After the comparing step 202 is completed, the method continues to recommending step 204. At recommending step 204, one or more services associated with the multi-dimensional vector information are recommended if the multi-dimensional vector information exceeds the threshold.

Figure 3:
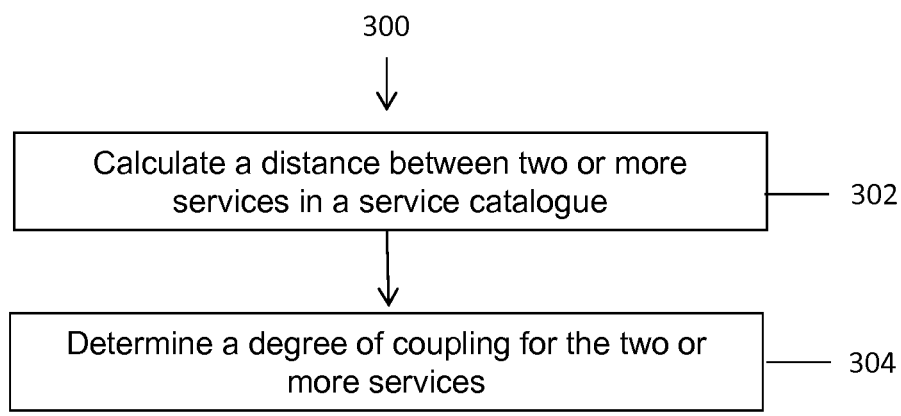
FIG. 3 shows a method for analyzing received metadata to determine whether to perform a management activity on a service catalog in accordance with an embodiment of the invention.

FIG. 3 shows a method for analyzing received metadata to determine whether to perform a management activity on a service catalog in accordance with an embodiment of the invention. For example, analyzing step 104 of FIG. 1 may further include the method steps of FIG. 3.

The method of FIG. 3 includes a calculating step 302. At calculating step 302, a distance is calculated between two or more services associated with received metadata. After the calculating step 302 is completed, the method continues to determining step 304.

At determining step 304, a degree of coupling is determined for two or more services associated with received metadata. In an embodiment, the degree of coupling can be either a tight coupling or a loose coupling.

Figure 4:
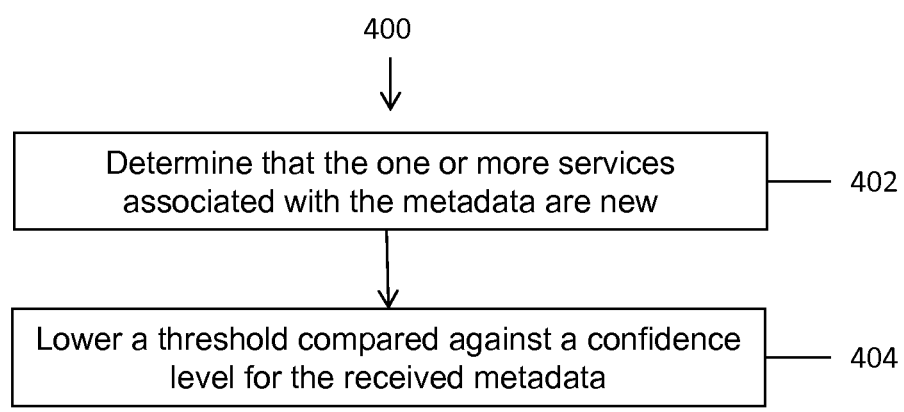
FIG. 4 shows a method for lowering a threshold compared to a confidence level for received metadata in accordance with an embodiment of the invention.

FIG. 4 shows a method for lowering a threshold compared to a confidence level for received metadata in accordance with an embodiment of the invention. The method of FIG. 4 includes determining step 402.

At determining step 402, one or more services associated with received metadata are determined to be new. After the determining step 402 is completed, the method continues to lowering step 404. At lowering step 404, if the one or more services are determined to be new, a threshold that is compared against a confidence level for received metadata is lowered.

Figure 5:
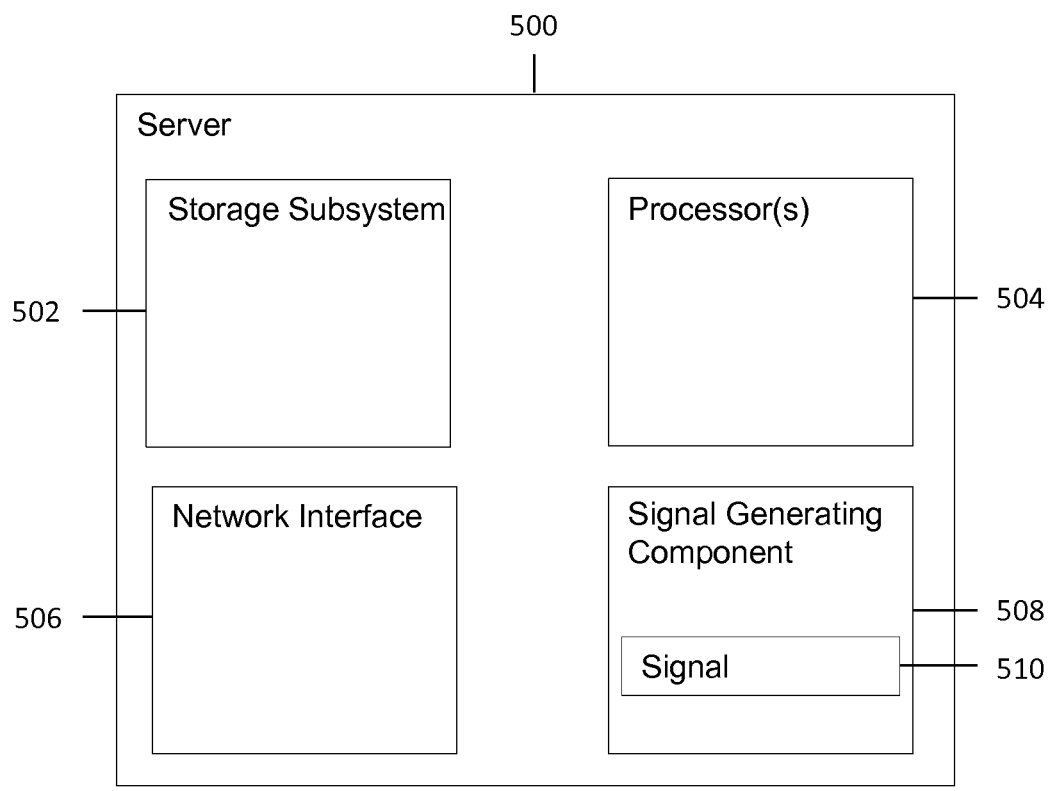
FIG. 5 shows a system for managing a plurality of services in a service catalog in accordance with an embodiment of the invention.

FIG. 5 shows a server 500 for managing a plurality of services in a service catalog in accordance with an embodiment of the invention. For example, server 500 of FIG. 5 may be used to implement the method steps of FIGS. 1-4. Server 500 includes storage subsystem 502, Processor(s) 504, network interface 506, signal generating component 508, and signal 510.

Storage subsystem 502 included in server 500 may comprise of a hard disk, a random access memory (RAM), a read-only memory (ROM), an erasable programmable read-only memory (EPROM or Flash memory), or any other suitable storage device or combinations thereof. Processor(s) 504 included in server 500 may comprise of one or more computer processors.

Figure 6:
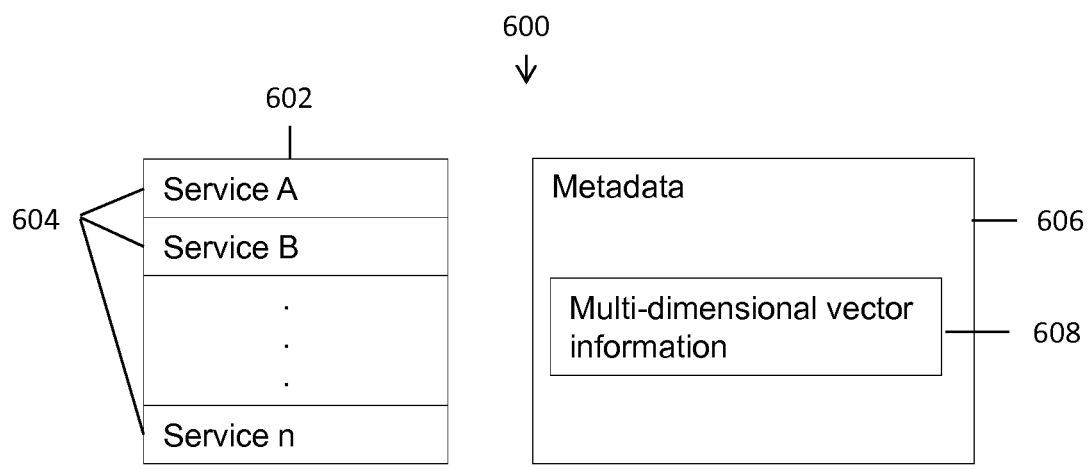
FIG. 6 shows data structures used to manage a plurality of services in a service catalog in accordance with an embodiment of the invention.

FIG. 6 shows data structures that may be used in combination with server 500 of FIG. 5 to manage the plurality of services in the service catalog in accordance with an embodiment of the invention. For example, storage subsystem 502 of FIG. 5 may store the data structures of FIG. 6. FIG. 6 includes service catalog 602, service(s) 604, metadata 606, and multi-dimensional vector information 608.

In an embodiment, server 500 receives metadata 606 about one or more of the services 604 in the service catalog 602. By way of example, the received metadata 606 is gathered via crowdsourcing. In an embodiment, metadata 606 includes multi-dimensional vector information 608 about one or more of the services 604. Processor(s) 504 then analyzes the metadata 606 to determine whether to perform a management activity on the service catalog 602. By way of example, the management activity may include recommending one or more services 604 in the service catalog 602 and/or coupling two or more services 604 in the service catalog 602.

In an embodiment, server 500 determines, based on the analysis, that the received metadata 606 is insufficient by comparing a confidence level for the received metadata 606 to a threshold. In an embodiment, server 500 further determines that the services 604 associated with metadata 606 are new. Based on the determination that the services 604 associated with metadata 606 are new, server 500 lowers the threshold compared against the confidence level for the received metadata 606.

In an embodiment, if the received metadata 606 is determined to be insufficient, signal generating component 508 generates signal 510. Signal 510 is a signal to gather additional metadata within a time period. By way of example, signal 510 further comprises a signal to collect additional metadata via crowdsourcing.

In an embodiment, server 500 determines whether to perform a management activity on the service catalog 602 by comparing multi-dimensional vector information 608 to a threshold. If the multi-dimensional vector information 608 exceeds the threshold, server 500 recommends the one or more services 604 associated with the multi-dimensional vector information 608. In an embodiment, comparing multi-dimensional vector information 608 to a threshold includes comparing a magnitude of the multi-dimensional vector information 608 to a threshold or comparing a projection of the multi-dimensional vector information 608 to a threshold.

In an embodiment, server 500 determines whether to perform a management activity on the service catalog 602 by determining a degree of coupling for two or more of the services 604 associated with metadata 606. By way of example, determining a degree of coupling for the two or more services 604 includes calculating a distance between the two or more services 604. In an embodiment, a degree of coupling for the two or more services 604 comprises a tight coupling or a loose coupling.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a plurality of services in a service catalog, the method comprising:
    receiving metadata about one or more of the services;
    analyzing, by a computer processor, the metadata to determine whether to perform a management activity on the service catalog, the management activity comprising at least one of:
        recommending one or more services in the service catalog and coupling two or more services in the service catalog;
        determining, based on the analysis, that the received metadata is insufficient; and
        generating a signal to gather additional metadata within a time period if the metadata is determined to be insufficient;
    wherein the received metadata comprises multi-dimensional vector information about one or more services; and
    wherein analyzing the metadata to determine whether to perform a management activity further comprises comparing the multi-dimensional vector information to a threshold, and, if the multi-dimensional vector information exceeds the threshold, recommending the one or more services associated with the multi-dimensional vector information.

2. The method of claim 1, wherein comparing the multi-dimensional vector information to the threshold further comprises at least one of:
    comparing a magnitude of the multi-dimensional vector information to a threshold and comparing a projection of the multi-dimensional vector information to a threshold.

3. The method of claim 1, wherein analyzing the metadata to determine whether to perform a management activity further comprises determining a degree of coupling for two or more of the services associated with the metadata.

4. The method of claim 3, wherein a degree of coupling for the two or more services comprises one of a tight coupling or a loose coupling.

5. The method of claim 3, wherein determining a degree of coupling for the two or more services includes calculating a distance between the two or more services.

6. The method of claim 1, wherein the received metadata is gathered via crowdsourcing and the generated signal further comprises a signal to collect additional metadata via crowdsourcing.

7. The method of claim 1, wherein determining, based on the analysis, that the received metadata is insufficient further comprises comparing a confidence level for the received metadata to a threshold.

8. The method of claim 7 further comprising,
    determining that the one or more services associated with the metadata are new; and
    based on the determining, lowering the threshold.

9. A system for managing a plurality of services in a service catalog, the system comprising:
    a server including a computer processor, the server configured to:
        receive metadata about one or more of the services;
        analyze, by the processor, the metadata to determine whether to perform a management activity on the service catalog, the management activity comprising:
            recommending one or more services in the service catalog and coupling two or more services in the service catalog;
    wherein the received metadata comprises multi-dimensional vector information about one or more services; and
    wherein the server is further configured to analyze the metadata to determine whether to perform a management activity by comparing the multi-dimensional vector information to a threshold, and, if the multi-dimensional vector information exceeds the threshold, recommending the one or more services associated with the multi-dimensional vector information.

10. The system of claim 9, wherein comparing the multi-dimensional vector information to the threshold further comprises at least one of: comparing a magnitude of the multi-dimensional vector information to a threshold and comparing a projection of the multi-dimensional vector information to a threshold.

11. The system of claim 9, wherein the server is further configured to analyze the metadata to determine whether to perform a management activity by determining a degree of coupling for two or more of the services associated with the metadata.

12. The system of claim 11, wherein a degree of coupling for the two or more services comprises one of a tight coupling or a loose coupling.

13. The system of claim 11, wherein determining a degree of coupling for the two or more services includes calculating a distance between the two or more services.

14. The system of claim 9, wherein the received metadata is gathered via crowdsourcing and the generated signal further comprises a signal to collect additional metadata via crowdsourcing.

15. The system of claim 9, wherein the server is further configured to determine, based on the analysis, that the received metadata is insufficient by comparing a confidence level for the received metadata to a threshold.

16. The system of claim 15, wherein the server is further configured to:
  determine that the one or more services associated with the metadata are new; and
  based on the determining, lower the threshold.

17. A computer program product for managing a plurality of services in a service catalog, the computer program product comprising:
  a non-transitory computer readable storage medium having computer readable program code embodied therewith, the computer readable program code configured to:
    receive metadata about one or more of the services;
    analyze, by the processor, the metadata to determine whether to perform a management activity on the service catalog, the management activity comprising:
      determining, based on the analysis, that the received metadata is insufficient
  wherein the received metadata comprises multi-dimensional vector information about one or more services; and
  analyze the metadata to determine whether to perform a management activity by comparing the multi-dimensional vector information to a threshold, and, if the multi-dimensional vector information exceeds the threshold, recommending the one or more services associated with the multi-dimensional vector information.

18. The computer program product of claim 17, wherein comparing the multi-dimensional vector information to the threshold further comprises at least one of: comparing a magnitude of the multi-dimensional vector information to a threshold and comparing a projection of the multi-dimensional vector information to a threshold.

19. The computer program product of claim 17, further comprising computer readable program code configured to analyze the metadata to determine whether to perform a management activity by determining a degree of coupling for two or more of the services associated with the metadata.

* * * * *